United States Patent
Murata

(10) Patent No.: US 8,554,263 B2
(45) Date of Patent: *Oct. 8, 2013

(54) APPARATUS FOR CONTROLLING SIGNAL-TRANSMISSION POWER, MOBILE STATION, METHOD OF CONTROLLING SIGNAL-TRANSMISSION POWER, AND PROGRAM

(75) Inventor: Yoshitaka Murata, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/572,309

(22) Filed: Aug. 10, 2012

(65) Prior Publication Data

US 2012/0307664 A1    Dec. 6, 2012

Related U.S. Application Data

(63) Continuation of application No. 12/282,916, filed as application No. PCT/JP2007/054183 on Mar. 5, 2007.

(30) Foreign Application Priority Data

Mar. 15, 2006 (JP) ................................. 2006-070116

(51) Int. Cl.
    *H04B 7/00* (2006.01)
(52) U.S. Cl.
    USPC ............. 455/522; 455/67.11; 455/68; 455/69
(58) Field of Classification Search
    USPC ............... 455/522, 67.11, 68–70, 115.3, 126, 455/127.1, 127.2, 135, 226.3, 277.2, 296; 370/318
    See application file for complete search history.

(56) References Cited

U.S. PATENT DOCUMENTS

| 5,619,321 A | 4/1997 | Artiglia et al. | |
| 7,173,966 B2 | 2/2007 | Miller | |
| 2001/0055329 A1* | 12/2001 | Odenwalder | 375/130 |
| 2002/0101377 A1* | 8/2002 | Crawford | 343/702 |
| 2002/0187801 A1* | 12/2002 | Vanghi | 455/522 |
| 2003/0025561 A1* | 2/2003 | Hoheisel et al. | 330/302 |
| 2003/0108088 A1* | 6/2003 | Odenwalder et al. | 375/146 |

(Continued)

FOREIGN PATENT DOCUMENTS

| JP | 2001-308723 A | 11/2001 |
| JP | 2005-252388 A | 9/2005 |
| JP | 2006-20234 A | 1/2006 |

OTHER PUBLICATIONS

3GPP Release 6 TS 25.211 V6.7.0, "Physical channels and mapping of transport channels onto physical channels (FDD)" Dec. 2005.

(Continued)

*Primary Examiner* — Dominic E Rego
(74) *Attorney, Agent, or Firm* — Sughrue Mion, PLLC

(57) ABSTRACT

The peak-index calculator calculates a peak index as an indication of PAR in accordance with gain factors β of channels. The coefficient selector includes a lookup table storing therein fitting coefficients X and Y each categorized in accordance with a combination of β, and selects coefficients X and Y each having a value determined in accordance with a combination of the gain factors β. The power-reduction calculator calculates a reduction in maximum signal-transmission power in accordance with both the peak index and the selected coefficients X and Y. The TXAGC calculator controls maximum signal-transmission power in accordance with the calculated reduction.

8 Claims, 16 Drawing Sheets

(56) References Cited

U.S. PATENT DOCUMENTS

| | | | |
|---|---|---|---|
| 2003/0155976 A1* | 8/2003 | Weber et al. | 330/277 |
| 2004/0000948 A1* | 1/2004 | Stengel et al. | 330/136 |
| 2004/0109492 A1* | 6/2004 | Viero et al. | 375/130 |
| 2006/0135095 A1 | 6/2006 | Goldberg et al. | |
| 2006/0217088 A1 | 9/2006 | Nagaoka | |
| 2007/0178857 A1 | 8/2007 | Greene et al. | |
| 2007/0263272 A1 | 11/2007 | Tam et al. | |
| 2008/0211587 A1* | 9/2008 | Elia | 330/302 |
| 2008/0212524 A1* | 9/2008 | Niwano | 370/329 |
| 2009/0131027 A1* | 5/2009 | Breuer et al. | 455/418 |
| 2009/0285329 A1* | 11/2009 | Matsuoka et al. | 375/297 |

OTHER PUBLICATIONS

3GPP Release 6 TS 25.213 V6.4.0, "Spreading and modulation (FDD)" Sep. 2005.

3GPP Release 5 TS 25.101 V5.13.0, "User Equipment (UE) Radio Transmission and Reception (FDD)" Dec. 2004.

* cited by examiner

FIG.4

| Signalled values for $\beta_c$ and $\beta_d$ | Quantized amplitude ratios $\beta_c$ and $\beta_d$ |
|---|---|
| 15 | 1.0 |
| 14 | 14/15 |
| 13 | 13/15 |
| 12 | 12/15 |
| 11 | 11/15 |
| 10 | 10/15 |
| 9 | 9/15 |
| 8 | 8/15 |
| 7 | 7/15 |
| 6 | 6/15 |
| 5 | 5/15 |
| 4 | 4/15 |
| 3 | 3/15 |
| 2 | 2/15 |
| 1 | 1/15 |
| 0 | Switch off |

FIG.5

| Signalled values for $\Delta_{ACK}$, $\Delta_{NACK}$ and $\Delta_{CQI}$ | Quantized amplitude ratios $A_{hs} = \beta_{hs}/\beta_c$ |
|---|---|
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

FIG.6

| Signalled values for Δ E-DPCCH | Quantized amplitude ratios $A_{ec} = \beta_{ec}/\beta_c$ |
|---|---|
| 8 | 30/15 |
| 7 | 24/15 |
| 6 | 19/15 |
| 5 | 15/15 |
| 4 | 12/15 |
| 3 | 9/15 |
| 2 | 8/15 |
| 1 | 6/15 |
| 0 | 5/15 |

FIG.7

| Signalled values for Δ E-DPDCH | Quantized amplitude ratios $A_{ed} = \beta_{ed}/\beta_c$ |
|---|---|
| 29 | 168/15 |
| 28 | 150/15 |
| 27 | 134/15 |
| 26 | 119/15 |
| 25 | 106/15 |
| 24 | 95/15 |
| 23 | 84/15 |
| 22 | 75/15 |
| 21 | 67/15 |
| 20 | 60/15 |
| 19 | 53/15 |
| 18 | 47/15 |
| 17 | 42/15 |
| 16 | 38/15 |
| 15 | 34/15 |
| 14 | 30/15 |
| 13 | 27/15 |
| 12 | 24/15 |
| 11 | 21/15 |
| 10 | 19/15 |
| 9 | 17/15 |
| 8 | 15/15 |
| 7 | 13/15 |
| 6 | 12/15 |
| 5 | 11/15 |
| 4 | 9/15 |
| 3 | 8/15 |
| 2 | 7/15 |
| 1 | 6/15 |
| 0 | 5/15 |

FIG.8

| $N_{max\text{-}dpdch}$ | HS-DSCH configured | E-DPDCH$_k$ | $iq_{ed,k}$ |
|---|---|---|---|
| 0 | No/Yes | E-DPDCH$_1$ | 1 |
|   |   | E-DPDCH$_2$ | j |
|   |   | E-DPDCH$_3$ | 1 |
|   |   | E-DPDCH$_4$ | j |
| 1 | No | E-DPDCH$_1$ | j |
|   |   | E-DPDCH$_2$ | 1 |
| 1 | Yes | E-DPDCH$_1$ | 1 |
|   |   | E-DPDCH$_2$ | j |

FIG.10

| Category | $\beta c$ | $\beta d$ | $\beta hs$ | Number of $\beta ed$ | Fitting Coefficient X | Fitting Coefficient Y |
|---|---|---|---|---|---|---|
| 0 | >0 | ≧0 | ≧0 | 0 | x0 | y0 |
| 1 | >0 | 0 | 0 | 1 | x1 | y1 |
| 2 | >0 | 0 | 0 | 2 | x2 | y2 |
| 3 | >0 | 0 | 0 | 4 | x3 | y3 |
| 4 | >0 | 0 | >0 | 1 | x4 | y4 |
| 5 | >0 | 0 | >0 | 2 | x5 | y5 |
| 6 | >0 | 0 | >0 | 4 | x6 | y6 |
| 7 | >0 | >0 | >0 | 1 | x7 | y7 |
| 8 | >0 | >0 | >0 | 2 | x8 | y8 |

FIG.15

| Index | $\beta$ ed_reduce $A_{ed} = \beta_{ed}/\beta_c$ | Reduction in Maximum Signal-Transmission Power backoff$_i$(dB) |
|---|---|---|
| 29 | 168/15 | 0.7 |
| 28 | 150/15 | 0.916 |
| 27 | 134/15 | 1.108 |
| 26 | 119/15 | 1.288 |
| 25 | 106/15 | 1.444 |
| 24 | 95/15 | 1.576 |
| 23 | 84/15 | 1.708 |
| 22 | 75/15 | 1.816 |
| 21 | 67/15 | 1.912 |
| 20 | 60/15 | 1.996 |
| 19 | 53/15 | 2.08 |
| 18 | 47/15 | 2.152 |
| 17 | 42/15 | 2.212 |
| 16 | 38/15 | 2.2 |
| 15 | 34/15 | 1.96 |
| 14 | 30/15 | 1.72 |
| 13 | 27/15 | 1.54 |
| 12 | 24/15 | 1.36 |
| 11 | 21/15 | 1.18 |
| 10 | 19/15 | 1.06 |
| 9 | 17/15 | 0.94 |
| 8 | 15/15 | 0.82 |
| 7 | 13/15 | 0.7 |
| 6 | 12/15 | 0.64 |
| 5 | 11/15 | 0.58 |
| 4 | 9/15 | 0.46 |
| 3 | 8/15 | 0.4 |
| 2 | 7/15 | 0.34 |
| 1 | 6/15 | 0.28 |
| 0 | 5/15 | 0.22 |

APPARATUS FOR CONTROLLING SIGNAL-TRANSMISSION POWER, MOBILE STATION, METHOD OF CONTROLLING SIGNAL-TRANSMISSION POWER, AND PROGRAM

This application is a Continuation of U.S. application Ser. No. 12/282,916 filed Sep. 15, 2008, which is a National Stage Application of International Application No. PCT/JP2007/054183 filed Mar. 5, 2007, which claims priority from Japanese Patent Application No. 2006-070116 filed Mar. 15, 2006, which applications are incorporated herein by reference.

BACKGROUND OF THE INVENTION

1. Field of the Invention

The invention relates to an apparatus for controlling signal-transmission power, a mobile station including the apparatus for controlling signal-transmission power, a method of controlling signal-transmission power, and a program for carrying out the method, and more particularly to such an apparatus, such a mobile station, such a method, and such a program all for controlling maximum signal-transmission power among power for transmitting a plurality of signals multiplexed with one another.

2. Description of the Related Art

In a field of communication of a mobile such as a mobile phone, 3GPP (3rd Generation Partnership Project) defines and suggests a standard for W-CDMA (Wideband-Code Division Multiple Access). Furthermore, as a method of transferring data at a high rate in an up-link channel, that is, from a user equipment UE to a base station, HSUPA (High Speed Uplink Packet Access) is additionally defined.

FIG. 16 is a block diagram illustrating a structure of a related HSUPA signal-transmission system.

As illustrated in FIG. 16, the related HSUPA signal-transmission system comprises a diffuser 101, a FIR filter 103, a DAC (Digital to Analog converter) 104, and a signal-transmission RF (Radio Frequency) part 105.

As illustrated in FIG. 16, in the HSUPA signal-transmission system, E-DPDCH (Enhanced Dedicated Physical Data Channel) is input into the diffuser 101 as a channel for transferring data therethrough, and E-DPCCH (Enhanced Dedicated Physical Control Channel) is input into the diffuser 101 as a channel for transferring control data therethrough.

These E-DPDCH and E-DPCCH are additionally code-multiplexed with a related W-CDMA Uplink channel, accomplishing high-rate data communication (non-patent reference 1).

As illustrated in FIG. 16, four or less code-multiplexing (E-DPDCH4, E-DPDCH3, E-DPDCH2, E-DPDCH1) is defined with respect to E-DPDCH (non-patent reference 2).

Furthermore, HS-DPCCH (High Speed Dedicated Physical Control Channel) used for HSDPA (High Speed Downlink Packet Access) is input into the diffuser 101 as a channel for transferring information about data re-transmission. HS-DPCCH is additionally code-multiplexed with a related W-CDMA Uplink channel.

If a number of channels to be code-multiplexed with W-CDMA channel were increased as mentioned above, PAR (Peak to Average power Ratio) defined as a ratio between peak power and average power in transmission of a signal would be increased, resulting in that power amplifier PA is deformed, and thus, ACLR (Adjacent Channel Leakage power Ratio) is deteriorated.

In 3GPP, there is defined a specification in which a number of channels to be multiplexed in a signal-transmission circuit equipped in a user equipment UE, and maximum signal-transmission power is fixedly reduced, if HSUPA (High Speed Uplink Packet Access) is not used (not-patent reference 3).

As a reduction (a back-off) of the maximum signal-transmission power, three fixed constants are stored in a lookup table in accordance only with a gain factor ($\beta c/\beta d$).

Non-patent reference 1: 3GPP Release 6 TS 25.211 V6.7.0, 5.2.1.3

Non-patent reference 2: 3GPP Release 6 TS 25.213 V6.4.0, 4.2

Non-patent reference 3: 3GPP Release 5 TS 25.101 V5.d.0, 6.2.2

On the other hand, if HSUPA (High Speed Uplink Packet Access) is used, a number of channels to be multiplexed is further increased, resulting in millions of a possible combination of gain factors $\beta$. Thus, if a lookup table were used in order to determine a reduction in maximum signal-transmission power in a related process, it would be difficult to carry out simply grouping with the result of an increase in an error in a reduction in maximum signal-transmission power.

In order to accurately calculate a reduction in maximum signal-transmission power, it would be necessary to sample waveforms of signals for a certain period of time in a path downstream of the FIR (Finite Impulse Response) filter 103, and process the results of sampling. However, it takes a lot of burden to process the results of sampling, and accordingly, a circuit structure is complex and a circuit size is increased in order to accomplish processing the results of sampling immediately prior to transmission of a signal.

If a reduction in maximum signal-transmission power were small relative to a peak, ACLR (Adjacent Channel Leakage power Ratio) would be deteriorated, and, in contrast, if a reduction in maximum signal-transmission power were wastefully high relative to a peak, there would be caused a problem that a cell area covered by a base station is narrowed.

Thus, there is a need for a method of accurately and readily calculating an optimal reduction in maximum signal-transmission power.

SUMMARY OF THE INVENTION

In view of the above-mentioned problems, it is an exemplary object of the present invention to provide an apparatus for controlling signal-transmission power, which makes it possible to accurately and readily calculate an optimal reduction in maximum signal-transmission power to prevent deterioration of ACLR (Adjacent Channel Leakage power Ratio), and prevent a cell area covered by a base station from being wastefully narrowed.

It is further an exemplary object of the present invention to provide a mobile station, a method of controlling signal-transmission power, and a program for carrying out the method, all of which make it possible to do the same.

In a first exemplary aspect of the present invention, the present invention provides a signal-transmission power controlling apparatus for controlling maximum signal-transmission power among power for transmitting a plurality of signals multiplexed with one another, including a reduction-calculating device for calculating a reduction in the maximum signal-transmission power in accordance with a peak index and a coefficient, the peak index being calculated based on gain factors used for giving a weight to each of the signals, the peak index providing an indication of a ratio between peak power and average power in a signal to be transmitted, the coefficient being predetermined in accordance with a combination of the gain factors, and a controlling device for controlling the maximum signal-transmission power in accordance with the reduction calculated by the reduction-calculating device.

It is preferable that the reduction-calculating device includes a peak-index calculating device which selects, as an average power indication, a square root of a sum of squares of each of the gain factors, and, as a peak power indication, a square root of a sum of (a) square of a sum of gain factors of channels assigned to I-phase among the gain factors, and (b) square of a sum of gain factors of channels assigned to Q-phase among the factors, and calculates, as the peak index, a ratio between the peak power indication and the average power indication.

It is preferable that the reduction-calculating device calculates the reduction in accordance with an equation:

$$\text{Reduction} = Y \times (20 \times \log_{10}(C))^X$$

wherein C indicates the peak index, and each of X and Y indicates the coefficient.

It is preferable that the reduction-calculating device calculates a reduction in each of cases in which a gain factor βed of E-DPDCH (Enhanced-Dedicated Physical Data Channel) among the gain factors is varied, and determines the gain factor βed and a reduction which minimize a difference between an allowable maximum signal-transmission power (allowable maximum signal-transmission power=maximum signal-transmission power−reduction) and total power in each of the cases.

It is preferable that the controlling device gives a weight to the E-DPDCH with the gain factor βed determined by the reduction-calculating device, and controls the maximum signal-transmission power in accordance with the reduction determined by the reduction-calculating device.

The above-mentioned signal-transmission power-controlling apparatus may be mounted in a mobile station, for instance.

The mobile station may be comprised of a mobile phone, for instance.

In a second exemplary aspect of the present invention, the present invention further provides a method of controlling maximum signal-transmission power among power for transmitting a plurality of signals multiplexed with one another, including a reduction-calculating step of calculating a reduction in the maximum signal-transmission power in accordance with a peak index and a coefficient, the peak index being calculated based on gain factors used for giving a weight to each of the signals, the peak index providing an indication of a ratio between peak power and average power in a signal to be transmitted, the coefficient being predetermined in accordance with a combination of the gain factors, and a controlling step of controlling the maximum signal-transmission power in accordance with the reduction calculated in the reduction-calculating step.

It is preferable that the reduction-calculating step includes a step of selecting, as an average power indication, a square root of a sum of squares of each of the gain factors, and, as a peak power indication, a square root of a sum of (a) square of a sum of gain factors of channels assigned to I-phase among the gain factors, and (b) square of a sum of gain factors of channels assigned to Q-phase among the factors, and calculating, as the peak index, a ratio between the peak power indication and the average power indication.

It is preferable that the reduction-calculating step includes a step of calculating the reduction in accordance with an equation:

$$\text{Reduction} = Y \times (20 \times \log_{10}(C))^X$$

wherein C indicates the peak index, and each of X and Y indicates the coefficient.

It is preferable that the reduction-calculating steps includes a step of calculating a reduction in each of cases in which a gain factor βed of E-DPDCH (Enhanced-Dedicated Physical Data Channel) among the gain factors is varied, and determining the gain factor βed and a reduction which minimize a difference between an allowable maximum signal-transmission power (allowable maximum signal-transmission power=maximum signal-transmission power−reduction) and total power in each of the cases.

It is preferable that the controlling step includes a step of giving a weight to the E-DPDCH with the gain factor βed determined in the reduction-calculating step, and controlling the maximum signal-transmission power in accordance with the reduction determined in the reduction-calculating step.

In a third exemplary aspect of the present invention, the present invention further provides a computer-readable storage medium storing therein a program for causing a computer to carry out a method of controlling maximum signal-transmission power among power for transmitting a plurality of signals multiplexed with one another, steps executed by the computer in accordance with the program including a reduction-calculating step of calculating a reduction in the maximum signal-transmission power in accordance with a peak index and a coefficient, the peak index being calculated based on gain factors used for giving a weight to each of the signals, the peak index providing an indication of a ratio between peak power and average power in a signal to be transmitted, the coefficient being predetermined in accordance with a combination of the gain factors, and a controlling step of controlling the maximum signal-transmission power in accordance with the reduction calculated in the reduction-calculating step.

It is preferable that the reduction-calculating step includes a step of selecting, as an average power indication, a square root of a sum of squares of each of the gain factors, and, as a peak power indication, a square root of a sum of (a) square of a sum of gain factors of channels assigned to I-phase among the gain factors, and (b) square of a sum of gain factors of channels assigned to Q-phase among the factors, and calculating, as the peak index, a ratio between the peak power indication and the average power indication.

It is preferable that the reduction-calculating step includes a step of calculating the reduction in accordance with an equation:

$$\text{Reduction} = Y \times (20 \times \log_{10}(C))^X$$

wherein C indicates the peak index, and each of X and Y indicates the coefficient.

It is preferable that the reduction-calculating steps includes a step of calculating a reduction in each of cases in which a gain factor βed of E-DPDCH (Enhanced-Dedicated Physical Data Channel) among the gain factors is varied, and determining the gain factor βed and a reduction which minimize a difference between an allowable maximum signal-transmission power (allowable maximum signal-transmission power=maximum signal-transmission power−reduction) and total power in each of the cases.

It is preferable that the controlling step includes a step of giving a weight to the E-DPDCH with the gain factor βed determined in the reduction-calculating step, and controlling the maximum signal-transmission power in accordance with the reduction determined in the reduction-calculating step.

In a fourth exemplary aspect of the present invention, the present invention further provides a signal-transmission power controlling apparatus for controlling maximum signal-transmission power among power for transmitting a plurality of signals multiplexed with one another, including a reduction-calculator for calculating a reduction in the maximum signal-transmission power in accordance with a peak index and a coefficient, the peak index being calculated based on gain factors used for giving a weight to each of the signals, the peak index providing an indication of a ratio between peak power and average power in a signal to be transmitted, the coefficient being predetermined in accordance with a combination of the gain factors, and a controller for controlling the maximum signal-transmission power in accordance with the reduction calculated by the reduction-calculator.

In a fifth exemplary aspect of the present invention, the present invention further provides a mobile station including a signal-transmission power-controlling apparatus for controlling maximum signal-transmission power among power for transmitting a plurality of signals multiplexed with one another, the signal-transmission power-controlling apparatus including a reduction-calculator for calculating a reduction in the maximum signal-transmission power in accordance with a peak index and a coefficient, the peak index being calculated based on gain factors used for giving a weight to each of the signals, the peak index providing an indication of a ratio between peak power and average power in a signal to be transmitted, the coefficient being predetermined in accordance with a combination of the gain factors, and a controller for controlling the maximum signal-transmission power in accordance with the reduction calculated by the reduction-calculator.

The above and other objects and advantageous features of the present invention will be made apparent from the following description made with reference to the accompanying drawings, in which like reference characters designate the same or similar parts throughout the drawings.

BRIEF DESCRIPTION OF THE DRAWINGS

FIG. 4 illustrates a quantization table of gain factors $\beta c$ and $\beta d$.

FIG. 5 illustrates a quantization table of $\beta hs/\beta c$.

FIG. 6 illustrates a quantization table of $\beta ec/\beta c$.

FIG. 7 illustrates a quantization table of $\beta ed/\beta c$.

FIG. 8 illustrates assignment of IQ-multiplex to E-DPDCH.

FIG. 10 illustrates an example of a coefficient selector which is a part of the TXAGC controller.

FIG. 15 illustrates an example of a table showing a reduction in maximum signal-transmission power for each of "$\beta ed\_reduce$".

DESCRIPTION OF THE EXEMPLARY EMBODIMENTS

First Exemplary Embodiment

Figure 1:
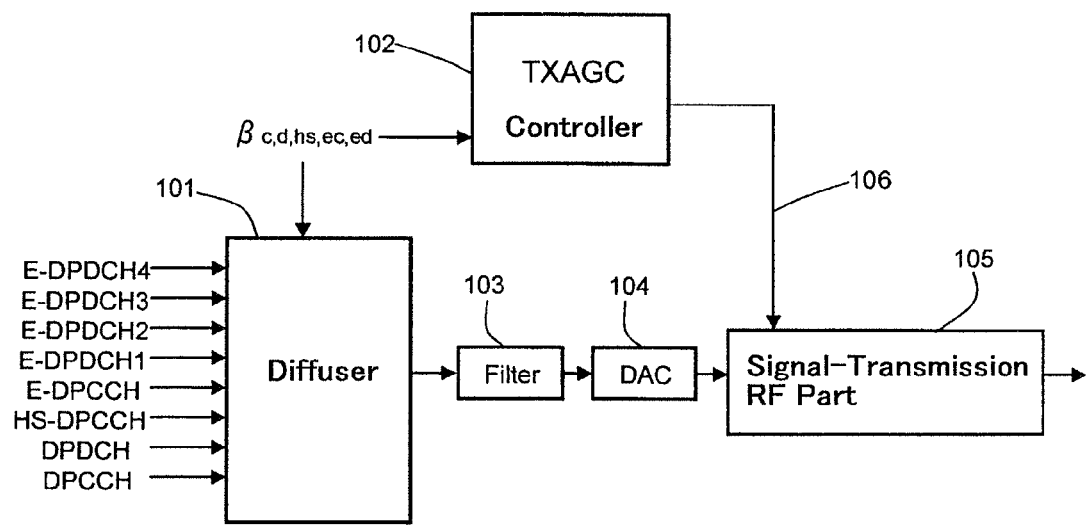
FIG. 1 is a block diagram illustrating a structure of the HSUPA signal-transmission system in accordance with the first exemplary embodiment of the present invention.

FIG. 1 is a block diagram illustrating a structure of a HSUPA signal-transmission system in accordance with the first exemplary embodiment of the present invention.

As illustrated in FIG. 1, the HSUPA signal-transmission system in accordance with the first exemplary embodiment of the present invention is comprised of a diffuser 101, a TXAGC (signal-transmission Auto Gain Control) controller 102, a FIR filter 103, a DAC (Digital/Analog Convertor) 104, and a signal-transmission RF (Radio Frequency) part 105.

The HSUPA signal-transmission system in accordance with the first exemplary embodiment is applied, for instance, to a mobile station (for instance, a mobile phone set) in a mobile communication system.

Figure 2:
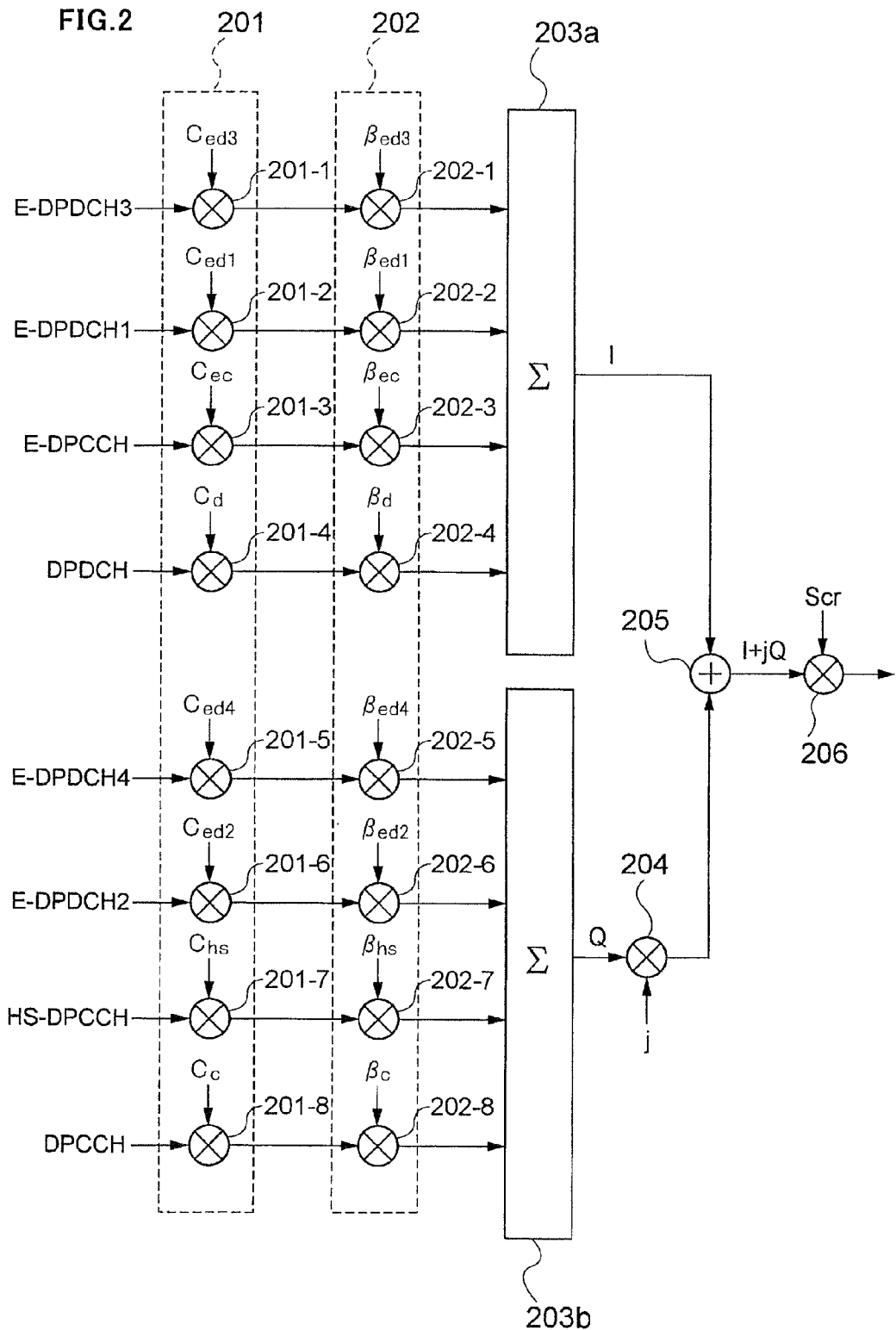
FIG. 2 is a block diagram illustrating a structure of a diffuser which is a part of the HSUPA signal-transmission system in accordance with the first exemplary embodiment of the present invention.

FIG. 2 is a block diagram illustrating a structure of the diffuser 101 in the HSUPA signal-transmission system in accordance with the first exemplary embodiment.

As illustrated in FIG. 2, the diffuser 101 comprises eight computing units 201-1 to 201-8, eight computing units 202-1 to 202-8, two adders 203a and 203b, a computing unit 204, an adder 205, and a computing unit 206.

As illustrated in FIGS. 1 and 2, signals in channels DPCCH, DPDCH, HS-DPCCH, E-DPCCH and E-DPDCH1 to E-DPDCH4 are code-multiplexed with one another, and then, transmitted in the HSUPA signal-transmission system in accordance with the first exemplary embodiment. The signals in E-DPDCH3, E-DPDCH1, E-DPCCH, DPDCH, E-DPDCH4, E-DPDCH2, HS-DPCCH and DPCCH are diffused in the computing units 201-1 to 201-8 with channelization codes Ced3, Ced1, Cec, Cd, Ced4, Ced2, Chs and Cc, respectively. Then, a weight is given to the signals in the computing units 202-1 to 202-8 with gain factors (parameters) $\beta ed3$, $\beta ed1$, $\beta ec$, $\beta d$, $\beta ed4$, $\beta ed2$, $\beta hs$ and $\beta c$, respectively.

The adder 203a adds output signals transmitted from the computing units 202-1 to 202-4 to one another, and outputs the sum as I branch.

The adder 203b adds output signals transmitted from the computing units 202-5 to 202-8 to one another, and outputs the sum as Q branch.

The computing unit 204 multiplies an output signal transmitted from the adder 203b by an imaginary number j.

The adder 205 adds an output signal transmitted from the adder 203a to an output signal transmitted from the computing unit 204.

An output signal transmitted from the adder 205 is again diffused in the computing unit 206 with a scrambling code Scr.

The FIR filter 103 is comprised of a root-raised cosine filter used for limiting a band.

The DAC (Digital/Analog Converter) 104 converts a digital signal transmitted from the FIR filter 103 to an analog signal.

The signal-transmission RF part 105 up-converts a frequency of the analog signal output from the DAC (Digital/Analog Converter) 104, amplifies the analog signal by means of a power amplifier PA (not illustrated), and transmits the analog signal as a radio signal through an antenna (not illustrated).

The signal-transmission RF part 105 has a function of receiving a TXAGC signal 106 from the TXAGC controller 102, and controlling a gain thereof.

The TXAGC controller 102 calculates power at which a signal is transmitted, and transmits a TXAGC signal 106 to the signal-transmission RF part 105 for controlling the signal-transmission RF part 105.

Figure 3:
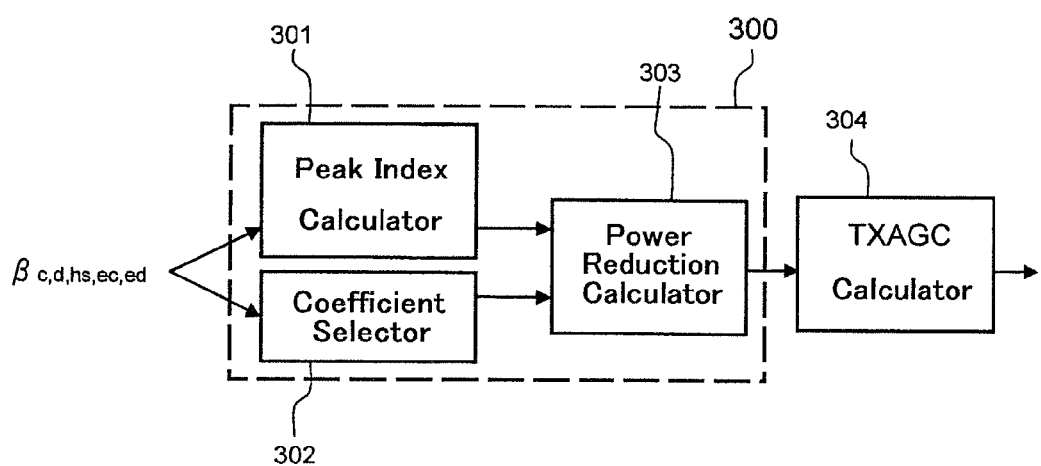
FIG. 3 is a block diagram illustrating a structure of a TXAGC controller which is a part of the HSUPA signal-transmission system in accordance with the first exemplary embodiment of the present invention.

FIG. 3 is a block diagram illustrating a structure of the TXAGC controller 102 in the HSUPA signal-transmission system in accordance with the first exemplary embodiment.

As illustrated in FIG. 3, the TXAGC controller 102 comprises a reduction calculator 300, and a TXAGC calculator 304.

The reduction calculator 300 comprises a peak index calculator 301, a coefficient selector 302, and a power reduction calculator 303.

The peak index calculator 301 includes a computing circuit which calculates a peak index as an indication of a peak to average power ratio (PAR) in accordance with both gain factors β in channels and assignment of IQ mapping in channels.

The coefficient selector 302 includes a lookup table rewritable by means of a non-volatile memory. The lookup table stores therein fitting coefficients X and Y each categorized in accordance with a combination of gain factors β.

The power reduction calculator 303 includes a computing circuit which solves an approximate equation in accordance with a peak index calculated by the peak index calculator 301 and fitting coefficients selected by the coefficient selector 302.

The TXAGC calculator 304 includes a circuit which calculates allowable maximum signal-transmission power defined by subtracting a reduction calculated by the power reduction calculator 303 from maximum signal-transmission power unique to a user equipment UE (allowable maximum signal-transmission power=maximum signal-transmission power−reduction).

Each of gain factors β is defined in 3GPP based on βc (see the non-patent reference 2).

Each of FIGS. 4 to 7 is a table showing gain factors β. Specifically, FIG. 4 is a quantization table of gain factors βc and βd, FIG. 5 is a quantization table of βhs/βc, FIG. 6 is a quantization table of βec/βc, and FIG. 7 is a quantization table of βed/βc.

In the example illustrated in FIG. 2, gain factors βd, βec, βed1 and βed3 (DPDCH, E-DPCCH, E-DPDCH1 and E-DPDCH3) are assigned to I side, and gain factors βc, βhs, βed2 and βed4 (DPCCH, HS-DPCCH, E-DPDCH2 and E-DPDCH4) are assigned to Q side.

If HS-DPCCH does not exist, but DPDCH exists, as illustrated in FIG. 8, a specification in which IQ assignment of a gain factor βed is reversed is defined in 3GPP (see the non-patent reference 2). FIG. 8 is a table showing assignment of IQ-multiplex to E-DPDCH.

Figure 9:
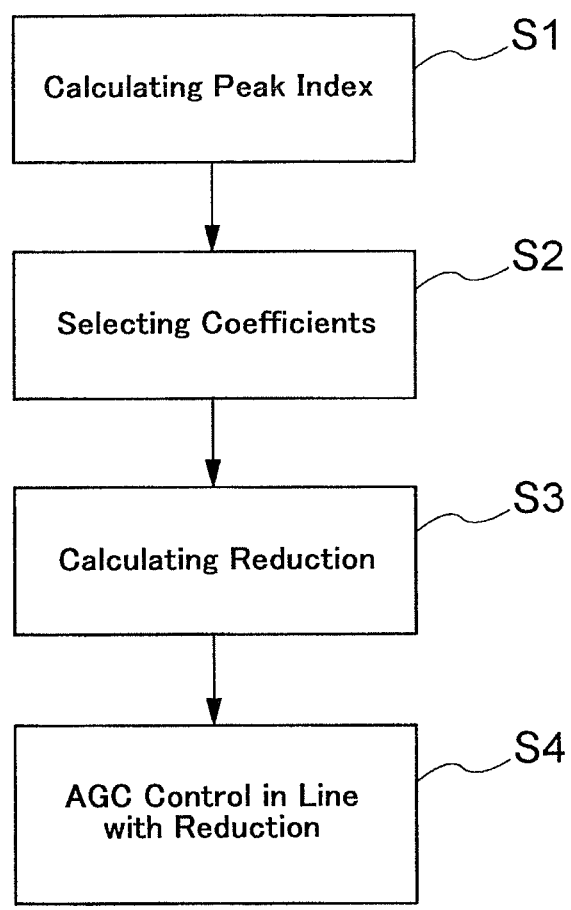
FIG. 9 is a flow-chart showing the operation of the HSUPA signal-transmission system in accordance with the first exemplary embodiment of the present invention.

FIG. 9 is a flow-chart showing an operation of the HSUPA signal-transmission system in accordance with the first exemplary embodiment of the present invention. Hereinbelow is explained the operation of the HSUPA signal-transmission system in accordance with the first exemplary embodiment of the present invention, with reference to FIG. 9.

As illustrated in FIGS. 1 and 2, eight channels DPCCH, DPDCH, HS-DPCCH, E-DPCCH, E-DPDCH1, E-DPDCH2, E-DPDCH3, and E-DPDCH4 are used in the HSUPA signal-transmission system in accordance with the first exemplary embodiment of the present invention.

Each of gain factors β corresponding to signal-transmission data in each of channels is optimally determined and appointed in an upper layer in accordance with communication status as a gain factor illustrated in FIGS. 4 to 7.

In FIG. 9, on determination of a combination of gain factors β in an upper layer, the peak index calculator 301 calculates a peak index (step S1).

Specifically, the peak index calculator 301 calculates an average power indication A in accordance with the equation (1).

$$A = \sqrt{\beta_c^2 + \beta_d^2 + \beta_{hs}^2 + \beta_{ec}^2 + \beta_{ed1}^2 + \beta_{ed2}^2 + \beta_{ed3}^2 + \beta_{ed4}^2} \qquad (1)$$

Furthermore, the peak index calculator 301 an IQ peak power indication B in accordance with the equation (2).

$$B = \sqrt{I\text{peak}^2 + Q\text{peak}^2} = \sqrt{(\beta_c + \beta_{hs} + \beta_{ed2} + \beta_{ed4})^2 + (\beta_d + \beta_{ec} + \beta_{ed1} + \beta_{ed3})^2} \qquad (2)$$

It should be noted that, as mentioned above, the assignment of gain factor βed mapping to IQ varies in accordance with FIG. 8.

Furthermore, the peak index calculator 301 calculates a peak index in accordance with the equation (3) (step S1).

$$C = \frac{B}{A} = \sqrt{\frac{(\beta_c + \beta_{hs} + \beta_{ed2} + \beta_{ed4})^2 + (\beta_d + \beta_{ed} + \beta_{ed1} + \beta_{ed3})^2}{\beta_c^2 + \beta_d^2 + \beta_{hs}^2 + \beta_{ec}^2 + \beta_{ed1}^2 + \beta_{ed2}^2 + \beta_{ed3}^2 + \beta_{ed4}^2}} \qquad (3)$$

The coefficient selector 302 selects fitting coefficients X and Y out of a lookup table in accordance with a combination of gain factors β (step S2).

FIG. 10 illustrates an example of a lookup table out of which the coefficient selector 302 selects fitting coefficients X and Y.

For instance, if a gain factor βc is greater than zero (βc>0), a gain factor βd is equal to or greater than zero (βd≥0), a gain factor βhs is equal to or greater than zero (βhs≥0), and a number of gain factors βed (a number of E-DPDCHs) is equal to zero, x0 and y0 are selected out of Category 1 as fitting coefficients X and Y.

The power reduction calculator 303 calculates a reduction dB of maximum signal-transmission power in accordance with the following equation, based o a peak index C calculated by the peak index calculator 301 and the fitting coefficients X and Y selected by the coefficient selector 302 (step S3).

$$dB = Y \times (20 \times \log_{10}(C))^X$$

A solution of this equation approximately expresses a reduction dB of maximum signal-transmission power.

The TXAGC calculator 304 calculates allowable maximum signal-transmission power in accordance with the following equation, based on the power reduction dB calculated by the power reduction calculator 303, for controlling signal-transmission power (step S4).

Figure 11:
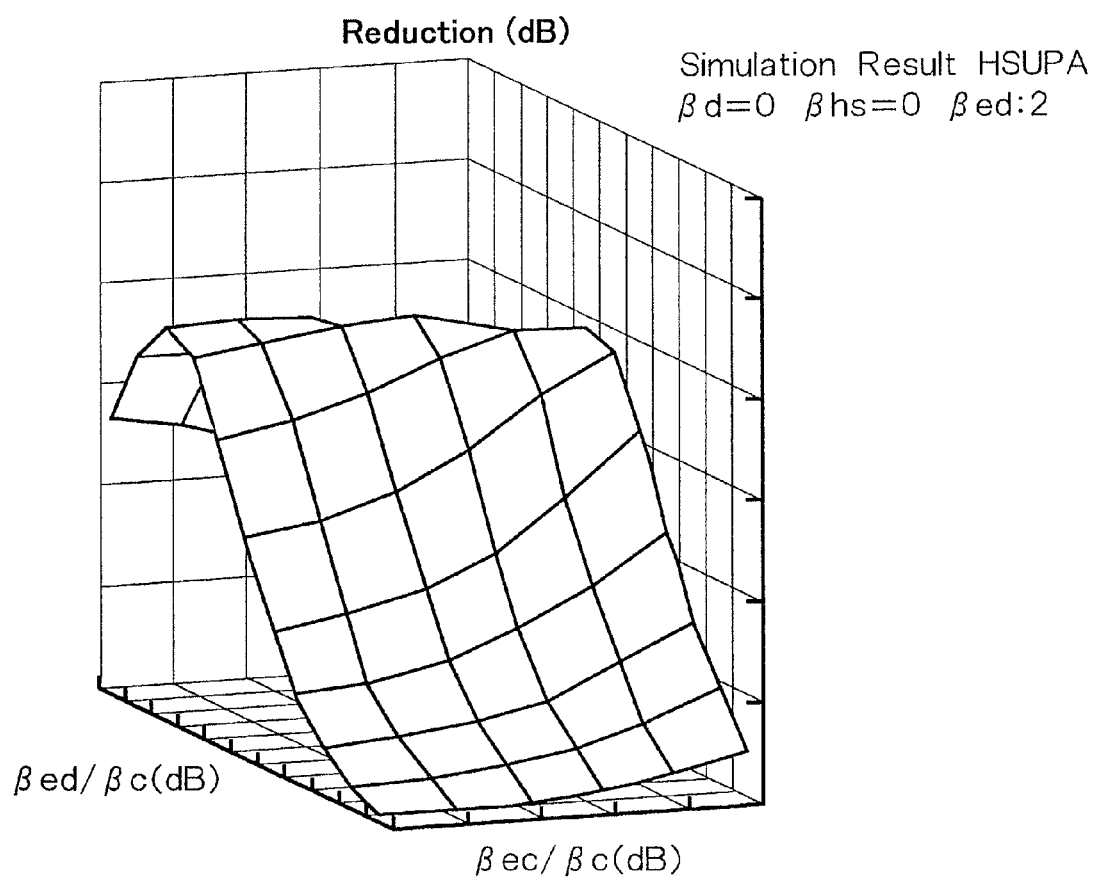
FIG. 11 illustrates the simulation result of a reduction in Category 2 in the lookup table illustrated in FIG. 10, obtained by processing PA output signals transmitted from the signal-transmission RF part.
Figure 12:
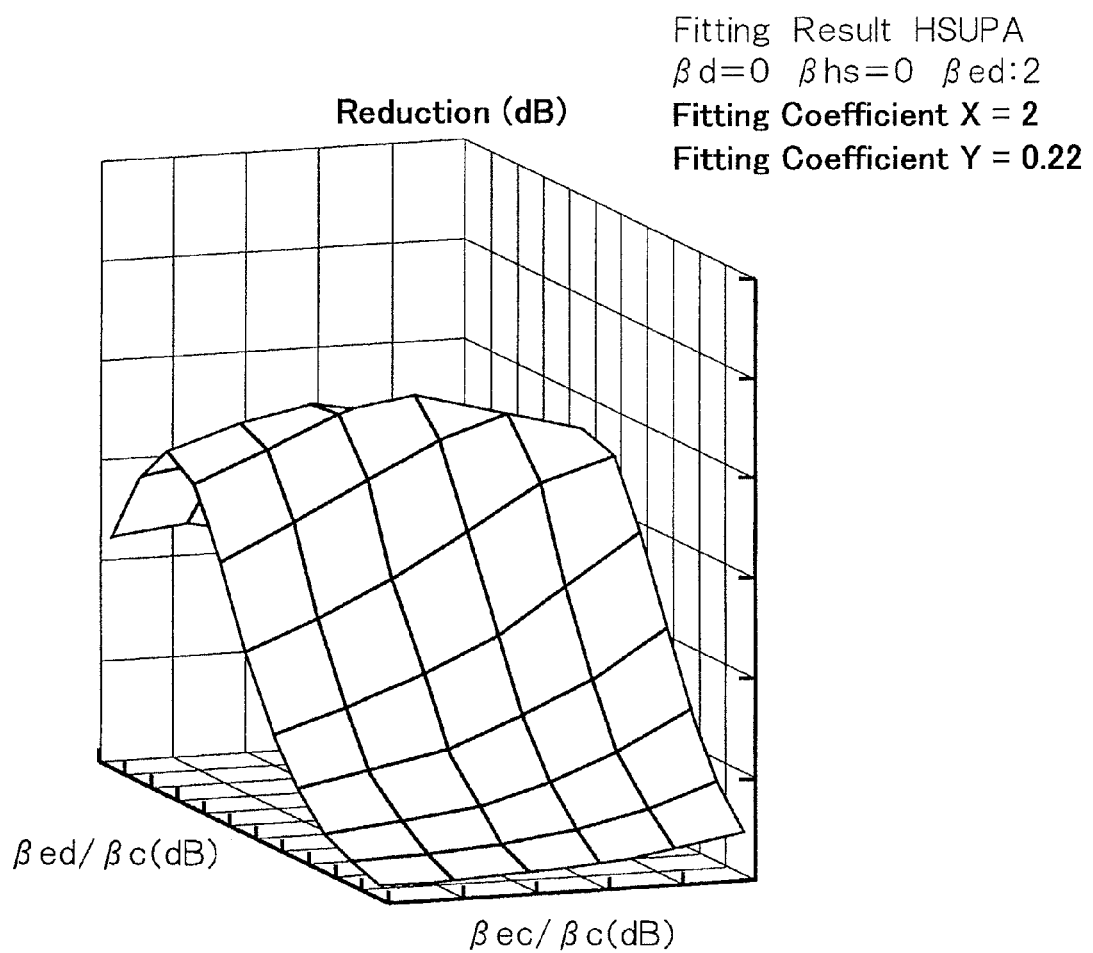
FIG. 12 illustrates an example of the results of a reduction in Category 2 in the lookup table illustrated in FIG. 10, obtained by approximate calculation carried out in the first exemplary embodiment of the present invention.

Allowable maximum signal-transmission
power=Maximum signal-transmission power−
Reduction FIG. 11 is a conceptional drawing showing the simulation results of a reduction in maximum signal-transmission power in Category in FIG. 10, obtained by processing PA output signals transmitted fro the signal-transmission RF part 105, and FIG. 12 illustrates an example of the results of a reduction in Category 2 in FIG. 10, obtained by the above-mentioned approximate calculation in the first exemplary embodiment of the present invention.

In FIG. 12, the fitting coefficient X is set equal to 2, and the fitting coefficient Y is set equal to 0.22.

Comparing FIGS. 11 and 12 to each other, the simulation results in FIG. 11 is almost coincident with the results of the approximate calculation carried out in accordance with the first exemplary embodiment of the present invention. This means that the first exemplary embodiment of the present invention makes it possible to accurately calculate a reduction in maximum signal-transmission power.

It is possible to cover an enormous number of combinations of gain factors β with a practical number of categories by carrying out fitting approach so as to approach the simulation results illustrated in FIG. 11, or by categorizing fitting coefficients X and Y, and determining fitting coefficients X and Y in each of categories.

In the above-mentioned equations used for calculating a reduction, the fitting coefficient X is equal principally to 1 or 2, and the fitting coefficient Y is principally in the range of 0 to 1 both inclusive.

The fitting coefficients X and Y can be set equal to arbitrary figures by means of a non-volatile memory. It is possible to store optimally adjusted fitting coefficients X and Y into a non-volatile memory by actually measuring an adjacent channel leakage power ratio ACLR when the HSUPA signal-transmission system is actually mounted into a device.

The HSUPA signal-transmission system in accordance with the first exemplary embodiment uses predetermined combinations of gain factors β, and makes it possible to approximately and accurately calculate a reduction in maximum signal-transmission power. Accordingly, it is no longer necessary to carry out complex calculation for processing signals, and it is possible to carry out signal processing at a high rate, and downsize a circuit. Since a reduction in maximum signal-transmission power can be accurately calculated though there is an enormous number of combinations of gain factors β, it is possible to avoid an adjacent channel leakage power ratio ACLR from being deteriorated, and prevent a cell area which a base station is able to cover from being wastefully narrowed.

The first exemplary embodiment is applied to a signal-transmission system employing HSUPA. However, it should be noted that an object to which the first exemplary embodiment is applied is not to be limited to a signal-transmission system, but the first exemplary embodiment may be applied to a CDMA-type transmitter.

Second Exemplary Embodiment

The HSUPA signal-transmission system in accordance with the second exemplary embodiment of the present invention is identical in structure to the HSUPA signal-transmission system in accordance with the first exemplary embodiment of the present invention, illustrated in FIG. 1, but the TXAGC controller 102 in the second exemplary embodiment of the present invention operates in a different manner from the TXAGC controller 102 in the first exemplary embodiment of the present invention.

As illustrated in FIG. 1, similarly to the HSUPA signal-transmission system in accordance with the first exemplary embodiment of the present invention, eight channels DPCCH, DPDCH, HS-DPCCH, E-DPCCH, E-DPDCH1, E-DPDCH2, E-DPDCH3, and E-DPDCH4 are used in the HSUPA signal-transmission system in accordance with the second exemplary embodiment of the present invention.

Each of gain factors β corresponding to signal-transmission data in each of channels is optimally determined and appointed in an upper layer in accordance with communication status as a gain factor illustrated in FIGS. 4 to 7.

In particular, with respect to a gain factor βed, 3GPP defines the "βed_reduce" specification in which a gain factor βed appointed by an upper layer varies slot by slot (3GPP Release 6 TS 25. 214 V6.7.1, 5.1.2.6).

In the "βed_reduce" specification, when DPCCH power as standard power increases only by Δ tpc in accordance with a TPC (Transmit Power Control) command controlled slot by slot, and total signal-transmission power exceeds allowable maximum signal-transmission power (allowable maximum signal-transmission power=maximum signal-transmission power−reduction), only a gain factor βed, that is, only E-DPDCH power is reduced.

3GPP defines a specification in which a gain factor βed is reduced to zero in accordance with a TPC command controlled slot by slot, though it depends on a combination of other channels (3GPP Release 6 TS 25. 214 V6. 7. 1, 5.1.2.6).

Figure 13:
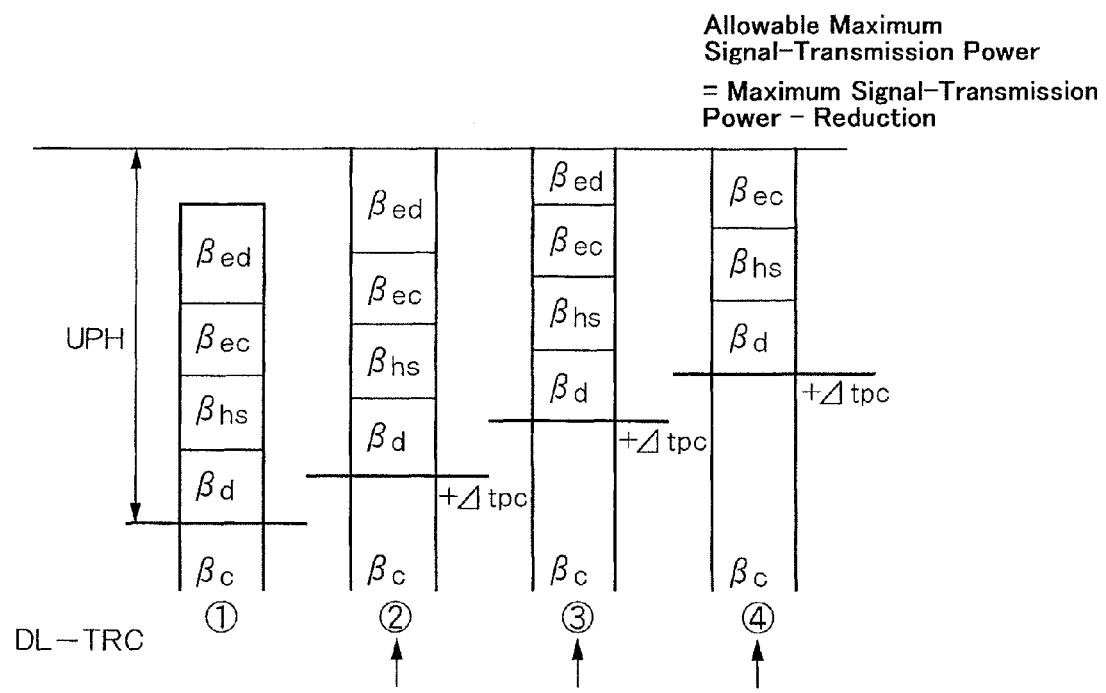
FIG. 13 illustrates "$\beta ed\_reduce$" in which a gain factor $\beta ed$ varies slot by slot.

However, if there occurs "βed_reduce" shown in FIG. 13, the results of the reduction illustrated in FIGS. 11 and 12, a reduction in maximum signal-transmission power varies in dependence on a gain factor βed. Accordingly, it is not possible in this case to follow fluctuation of PAR (Peak to Average power Ratio) varying slot by slot, if only allowable maximum signal-transmission power is calculated based on a reduction calculated in accordance with a gain factor βed appointed by an upper layer.

The second exemplary embodiment of the present invention makes it possible to optimally calculate "βed_reduce" into which consideration about a reduction following PAR (Peak to Average power Ratio) varying slot by slot is given, by virtue of approximate process for calculating a reduction in maximum signal-transmission power at a high rate and with high accuracy.

Figure 14:
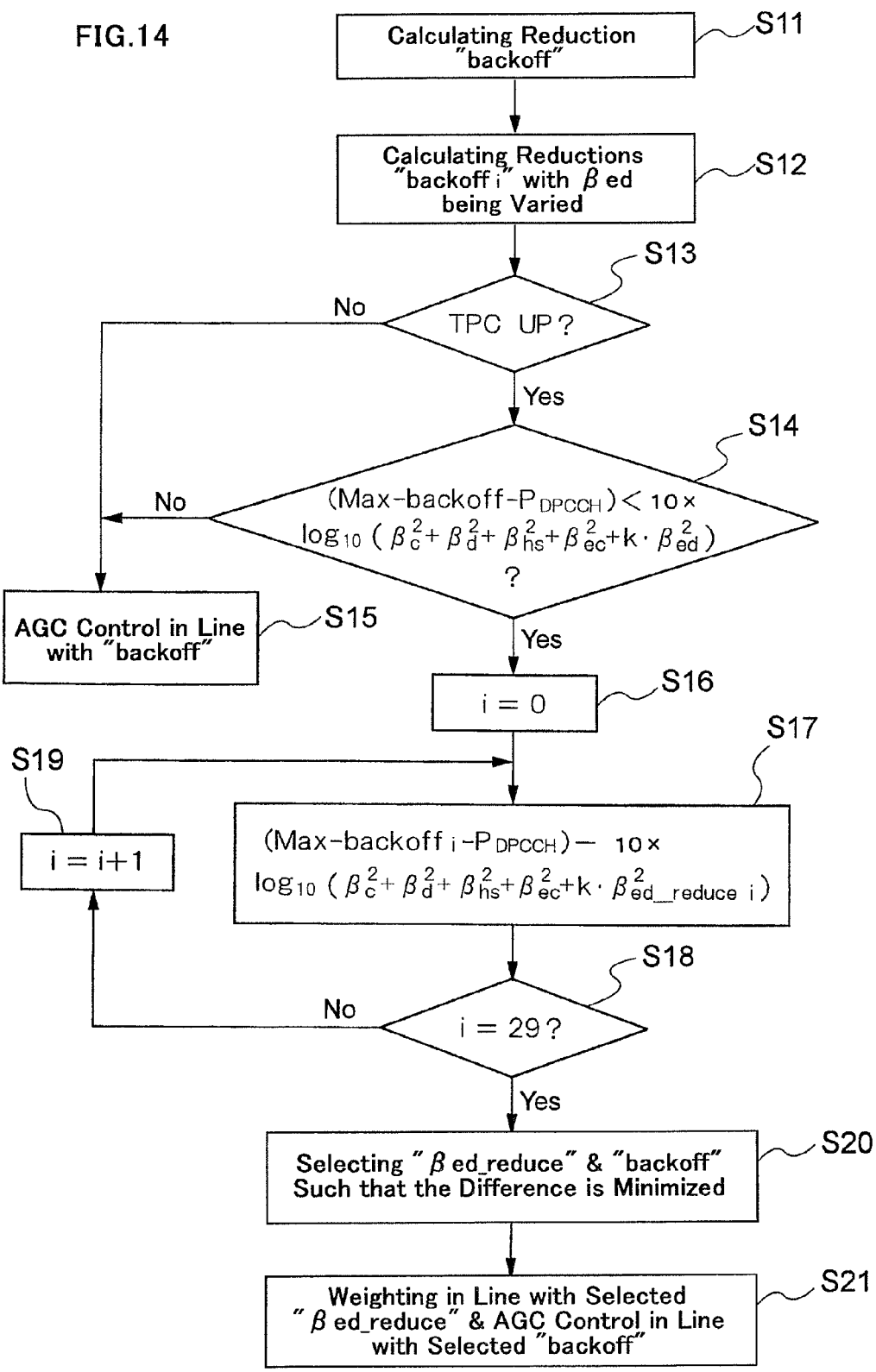
FIG. 14 is a flow-chart showing the operation of the HSUPA signal-transmission system in accordance with the second exemplary embodiment of the present invention.
Figure 16:
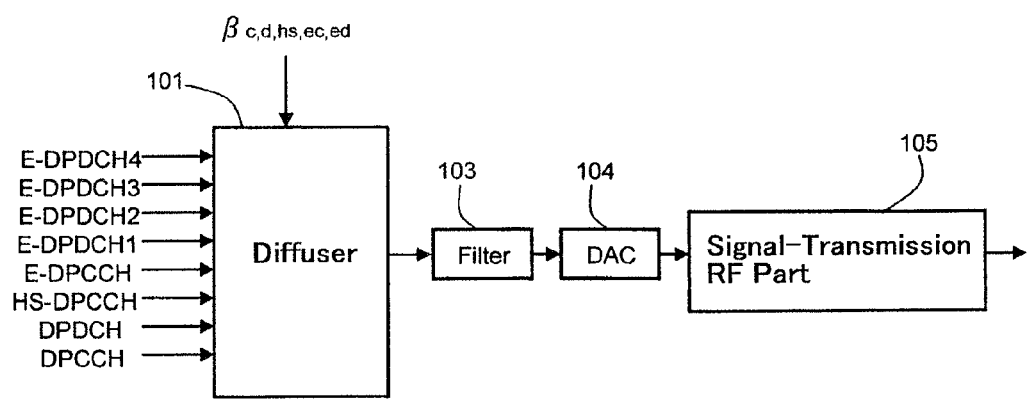
FIG. 16 is a block diagram illustrating a structure of the related HSUPA signal-transmission system.

FIG. 14 is a flow-chart showing an operation of the HSUPA signal-transmission system in accordance with the second exemplary embodiment of the present invention. Hereinbelow, an operation of the HSUPA signal-transmission system in accordance with the second exemplary embodiment is explained with reference to FIG. 14.

In FIG. 14, on determination of a combination of gain factors β by an upper layer, the TXAGC controller 102 calculates a reduction "backoff" in the same way as steps S1 to S3 having been explained in the first exemplary embodiment.

Then, the TXAGC controller 102 causes only a gain factor βed among the gain factors β having been determined by an upper layer to vary, and calculates reductions "backoffi" for each of the gain factors βed (step S12).

FIG. 15 is an example of a reduction table of "βed_reduce".

As illustrated in FIG. 15, the TXAGC controller 102 causes a gain factor βed to vary as shown in indexes 0 to 29, and calculates a reduction "backoffi" for each of gain factors βed.

It should be noted that the indexes 0 to 29 shown in FIG. 15 are just an example, and indexes are not to be limited to the indexes 0 to 29 shown in FIG. 15. For instance, a reduction "backoff" may be calculated with a gain factor βed being varied more finely or more roughly.

Then, the TXAGC controller 102 judges whether a TPC command instructs an increase in signal-transmission power TPC by Δtpc (step S13).

If the TXAGC controller 102 judges that the TPC command does not instruct an increase in signal-transmission power TPC by Δtpc (NO in step S13), the TXAGC controller 102 controls maximum signal-transmission power in accordance with the reduction "backoff" calculated in step S11, similarly to step S4 shown in FIG. 9 (step S15).

If TXAGC controller 102 judges that the TPC command instructs an increase in signal-transmission power TPC by Δtpc (YES in step S13), the TXAGC controller 102 judges whether a difference calculated by subtracting both the reduction "backoff" calculated in step S11 and DPCCH power PDPCCH to which Δtpc is added, from maximum signal-transmission power Max is smaller than signal-transmission power of DPDCH, HS-DPCCH, E-DPCCH and E-DPDCH, that is, $10 \times \log_{10}(\beta c^2 + \beta d^2 + \beta hs^2 + \beta ec^2 + k \times \beta ed^2)$ wherein "k" indicates a coefficient determined in accordance with a number of E-DPDCHs (step S14).

In other words, whether total signal-transmission power exceeds allowable maximum signal-transmission power (allowable maximum signal-transmission power=maximum signal-transmission power−reduction) is judged when DPCCH power increases by Δtpc.

If a difference calculated by subtracting both the reduction "backoff" and DPCCH power PDPCCH to which Δtpc is added from maximum signal-transmission power Max is not smaller than signal-transmission power of DPDCH, HS-DPCCH, E-DPCCH and E-DPDCH, that is, if maximum signal-transmission power does not exceed allowable maximum signal-transmission power (NO in step S14), there does not occur "βed_reduce", and hence, a reduction does not vary. Thus, the TXAGC controller 102 controls maximum signal-transmission power in accordance with the reduction having been calculated in step S11, similarly to step S4 shown in FIG. 9 (step S15).

If a difference calculated by subtracting both the reduction "backoff" and DPCCH power PDPCCH to which Δtpc is added from maximum signal-transmission power Max is smaller than signal-transmission power of DPDCH, HS-DPCCH, E-DPCCH and E-DPDCH, that is, if maximum signal-transmission power exceeds allowable maximum signal-transmission power (YES in step S14), the TXAGC controller 102 sets "i" to be equal to zero (i=0) (step S16) to select "βed_reduce 0" and a reduction "backoff 0" out of Index 0 in the table illustrated in FIG. 15. Then, the TXAGC controller 102 calculates a difference between a difference calculated by subtracting both the reduction "backoff 0" and DPCCH power PDPCCH to which Δtpc is added from the maximum signal-transmission power Max, and signal-transmission power of DPDCH, HS-DPCCH, E-DPCCH and E-DPDCH, that is, $10 \times \log_{10}(\beta c^2 + \beta d^2 + \beta hs^2 + \beta ec^2 + k \times (\beta ed\_reduce\ 0)^2)$ (step S17).

That is, the TXAGC controller 102 calculates a difference between allowable maximum signal-transmission power and total signal-transmission power.

The TXAGC controller 102 calculates a difference between allowable maximum signal-transmission power and total signal-transmission power for each of Indexes 1 to 29 shown in FIG. 15 (steps S18, S19 and S17).

After calculating a difference between allowable maximum signal-transmission power and total signal-transmission power for each of Indexes 1 to 29, the TXAGC controller 102 selects, among "βed_reduce"s and reductions, "βed_reduce" and a reduction which do not cause total signal-transmission power to exceed allowable maximum signal-transmission power, and minimize a difference among the calculated differences, as "βed_reduce" and a reduction to be used for a current slot (step S20).

Then, the TXAGC controller 102 give a weight to E-DP-DCH with the selected "βed_reduce", and controls maximum signal-transmission power in accordance with the selected reduction, similarly to step S9 shown in FIG. 9 (step S21).

The related process in which waveforms of signals to be transmitted downstream of the FIR filter 103 are sampled for a certain period of time, and a reduction in maximum signal-transmission power is obtained by processing the sampled signals is accompanied with a problem that it cannot follow a gain factor βed varying in line with fluctuation of DPCCH power caused slot by slot by a TPC command.

In contrast, the HSUPA signal-transmission system in accordance with the second exemplary embodiment makes it possible to calculate each of reductions at a high rate with a gain factor βed being varied, and thus, determine "βed_reduce" to which consideration about a reduction is given. Accordingly, it is possible to effectively prevent an adjacent channel leakage power ratio ACLR from being deteriorated, and further prevent a cell area covered by a base station from being narrowed.

Furthermore, since signal-transmission power can be effectively utilized, it is possible to enhance a throughput.

An operation of a user equipment UE to be carried out in accordance with the flow-charts shown in FIGS. 9 and 14 can be accomplished by storing a program into a storage medium such as ROM in a user equipment UE, causing a computer as CPU (central processing unit) to read the program, and causing the computer to execute the program.

In accordance with the above-mentioned exemplary embodiments, as mentioned above, a peak index providing an indication of a ratio between peak power and average power in a signal to be transmitted is calculated based on gain factors, and a reduction in maximum signal-transmission power is calculated in accordance with the thus calculated peak index and a coefficient predetermined in accordance with a combination of the gain factors. Thus, it is possible to approximately calculate a reduction in maximum signal-transmission power with high accuracy without carrying out complex calculation for processing signals.

While the present invention has been described in connection with certain exemplary embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A signal-transmission power-controlling apparatus for controlling maximum signal-transmission power among power for transmitting a plurality of signals multiplexed with one another, comprising:

a reduction-calculator for calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and a controller for controlling said maximum signal-transmission power in accordance with said reduction calculated by said reduction-calculator, wherein said reduction-calculator includes a peak-index calculator which selects, as an average power indication, a square root of a sum of squares of each of said value to determine an amplitude, and, as a peak power indication, a square root of a sum of (a) square of a sum of gain factors of channels assigned to I-phase among said gain factors, and (b) square of a sum of gain factors of channels assigned to Q-phase among said factors, and calculates, as said peak index, a ratio between said peak power indication and said average power indication.

2. A signal-transmission power controlling apparatus for controlling maximum signal-transmission power among power for transmitting a plurality of signals multiplexed with one another, comprising:

a reduction-calculator for calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and a controller for controlling said maximum signal-transmission power in accordance with said reduction calculated by said reduction-calculator, wherein said reduction-calculator calculates said reduction in accordance with an equation:

$$\text{Reduction}=Y\times(20\times\log_{10}(C))^X$$

where C indicates said peak index, and each of X and Y indicates said coefficient.

3. A mobile station, comprising:

a signal-transmission power controlling apparatus for controlling maximum signal-transmission power among power for transmitting a plurality of signals multiplexed with one another, including:

a reduction-calculator for calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and a controller for controlling said maximum signal-transmission power in accordance with said reduction calculated by said reduction-calculator;

wherein said reduction-calculator includes a peak-index calculator which selects, as an average power indication, a square root of a sum of squares of each of said value to determine an amplitude, and, as a peak power indication, a square root of a sum of (a) square of a sum of gain factors of channels assigned to I-phase among said gain factors, and (b) square of a sum of gain factors of channels assigned to Q-phase among said factors, and calculates, as said peak index, a ratio between said peak power indication and said average power indication.

4. A mobile station, comprising:

including a signal-transmission power controlling apparatus for controlling maximum signal-transmission power among power for transmitting a plurality of signals multiplexed with one another, comprising:

a reduction-calculator for calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and a controller for controlling said maximum signal-transmission power in accordance with said reduction calculated by said reduction-calculator, wherein said reduction-calculator calculates said reduction in accordance with an equation:

$$\text{Reduction}=Y\times(20\times\log_{10}(C))^X$$

where C indicates said peak index, and each of X and Y indicates said coefficient.

5. A method of controlling maximum signal-transmission power among power for transmitting a plurality of signals multiplexed with one another, comprising:

a reduction-calculating step of calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and a controlling step of controlling said maximum signal-transmission power in accordance with said reduction calculated in said reduction-calculating step;

wherein said reduction-calculating step includes a step of selecting, as an average power indication, a square root of a sum of squares of each of said value to determine an amplitude, and, as a peak power indication, a square root of a sum of (a) square of a sum of gain factors of channels assigned to I-phase among said gain factors, and (b) square of a sum of gain factors of channels assigned to Q-phase among said factors, and calculating, as said peak index, a ratio between said peak power indication and said average power indication.

6. A method of controlling maximum signal-transmission power among power for transmitting a plurality of signals multiplexed with one another, comprising:

a reduction-calculating step of calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and a controlling step of controlling said maximum signal-transmission power in accordance with said reduction calculated in said reduction-calculating step;

wherein said reduction-calculating step includes a step of calculating said reduction in accordance with an equation:

$$\text{Reduction}=Y\times(20\times\log_{10}(C))^X$$

where C indicates said peak index, and each of X and Y indicates said coefficient.

7. A non-transitory computer-readable storage medium storing therein a program for causing a computer to carry out a method of controlling maximum signal-transmission power among power for transmitting a plurality of signals multiplexed with one another, steps executed by said computer in accordance with said program, including:
- a reduction-calculating step of calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and
- a controlling step of controlling said maximum signal-transmission power in accordance with said reduction calculated in said reduction-calculating step;
- wherein said reduction-calculating step includes a step of selecting, as an average power indication, a square root of a sum of squares of each of said value to determine an amplitude, and, as a peak power indication, a square root of a sum of (a) square of a sum of gain factors of channels assigned to I-phase among said gain factors, and (b) square of a sum of gain factors of channels assigned to Q-phase among said factors, and calculating, as said peak index, a ratio between said peak power indication and said average power indication.

8. A non-transitory computer-readable storage medium storing therein a program for causing a computer to carry out a method of controlling maximum signal-transmission power among power for transmitting a plurality of signals multiplexed with one another, steps executed by said computer in accordance with said program, including:
- a reduction-calculating step of calculating a reduction in said maximum signal-transmission power in accordance with a peak index and a coefficient, said peak index being calculated based on a value to determine an amplitude of each of said signals, said peak index providing an indication of a ratio between peak power and average power in a signal to be transmitted, said coefficient being predetermined in accordance with a combination of said the value to determine an amplitude; and
- a controlling step of controlling said maximum signal-transmission power in accordance with said reduction calculated in said reduction-calculating step;
- wherein said reduction-calculating step includes a step of calculating said reduction in accordance with an equation:

$$\text{Reduction} = Y \times (20 \times \log_{10}(C))^X$$

where C indicates said peak index, and each of X and Y indicates said coefficient.

* * * * *